J. W. HALL & C. BAYNES.
DETACHABLE RIM FOR WHEELS.
APPLICATION FILED SEPT. 23, 1909.
1,010,621.
Patented Dec. 5, 1911
4 SHEETS—SHEET 2.
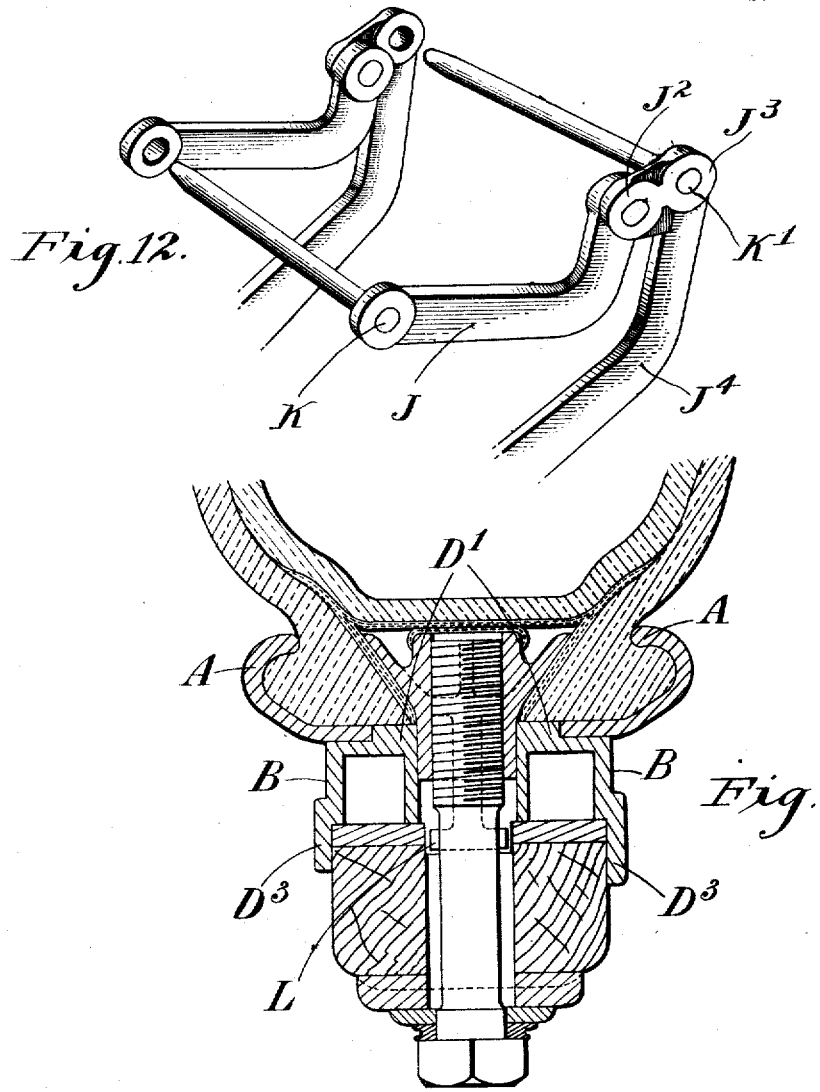
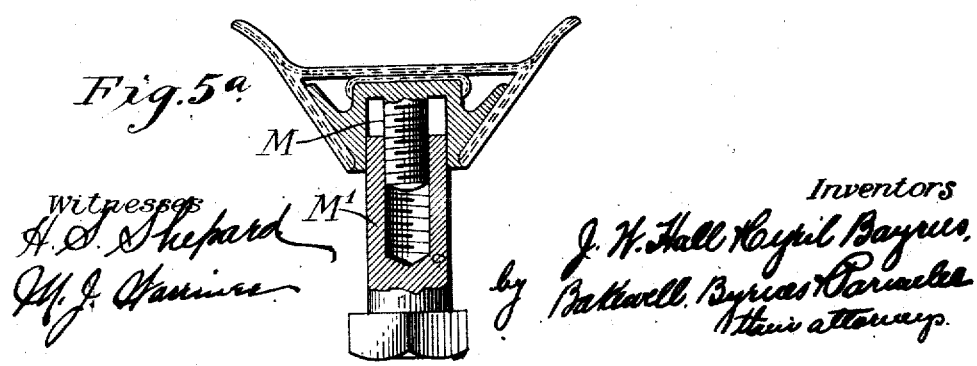

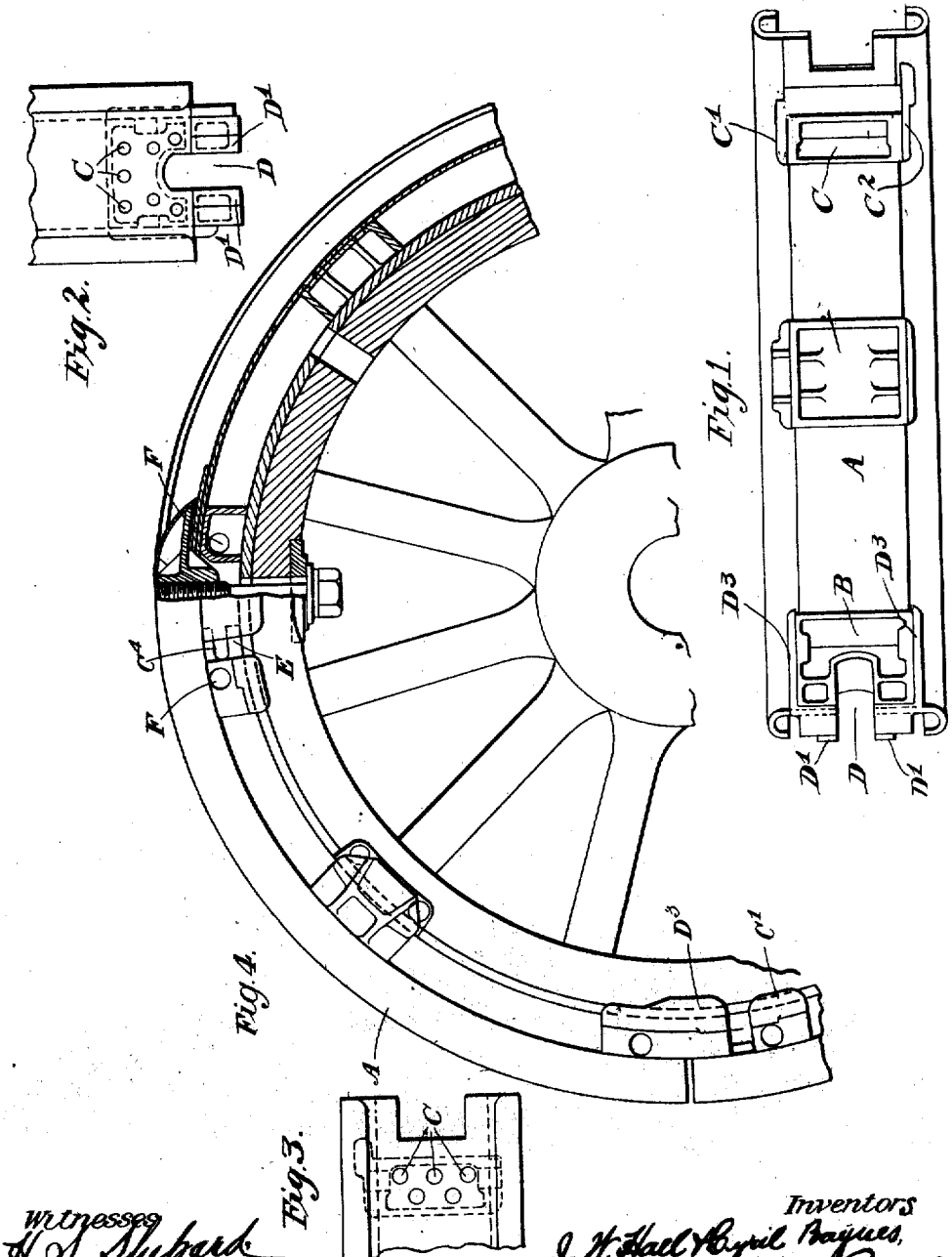

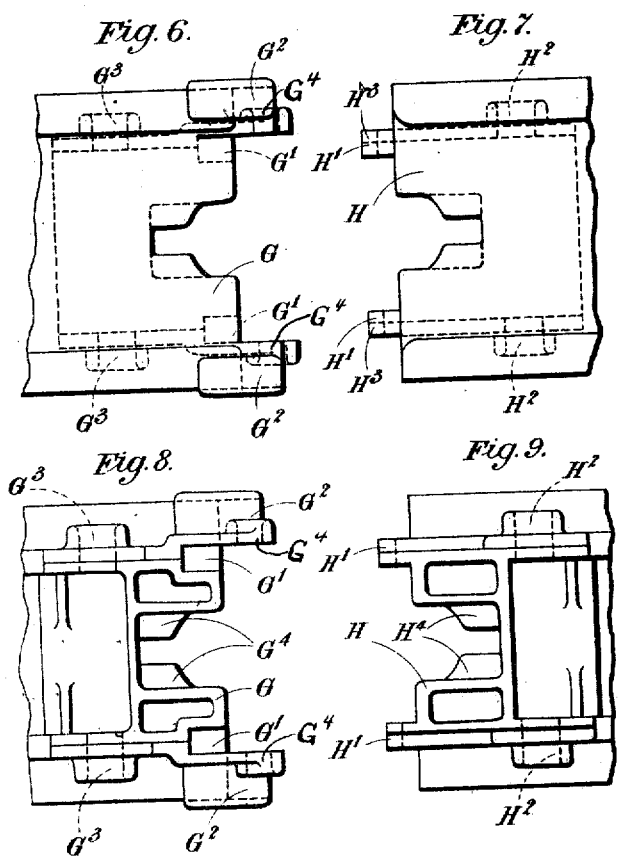

J. W. HALL & C. BAYNES.
DETACHABLE RIM FOR WHEELS.
APPLICATION FILED SEPT. 23, 1909.

1,010,621.

Patented Dec. 5, 1911.
4 SHEETS—SHEET 4.

Witnesses

Inventors.
J. W. Hall & Cyril Baynes.
by Bakewell, Byrnes & Parmelee
their attorneys.

UNITED STATES PATENT OFFICE.

JOHN WILLIAM HALL AND CYRIL BAYNES, OF LONDON, ENGLAND.

DETACHABLE RIM FOR WHEELS.

1,010,621.  Specification of Letters Patent.  Patented Dec. 5, 1911.

Application filed September 23, 1909. Serial No. 519,132.

*To all whom it may concern:*

Be it known that we, JOHN WILLIAM HALL and CYRIL BAYNES, both subjects of the King of England, residing at London, in England, have invented certain new and useful Improvements in Detachable Rims for Wheels, of which the following is a specification.

This invention relates to detachable rims for wheels which may be removed from and applied to the felly of the wheel by an axial movement even though the rim or felly is considerably out of truth. The rim is divided transversely into separable sections that are moved bodily away from or toward each other for the purpose of expanding or contracting the rim when it is to be applied to or removed from the felly. This rim preferably comprises four segments each of which may be applied separately to the tire. When in position the segments are forced apart and retained in this expanded position by means of keys operating at the junctions of the ends of the rim segments. The expanded rim is then applied to the felly of the wheel and afterward allowed to contract upon the felly by removing the keys.

This invention refers more particularly to an improved method of securing the tire to the rim and the rim to the wheel, and also an improved mechanism for separating the meeting ends of the sections.

According to this invention, in detachable rims having separable sections the tire is secured to the rim and the rim to the wheel or hub-member by a bolt passing through the felly and engaging a security pad inside the tire. Or the bolt may be integral with the security pad and adapted to receive a nut to secure it in place.

In order to separate the sections a toggle plate is pivotally connected to the short arm of a lever the toggle plate and the lever being pivoted to adjacent ends of two sections so that movement of the lever separates the sections. One end of the toggle plate and the fulcrum of the lever are provided with pins which pass through holes formed in the adjacent ends of the two sections and a similar device is applied to the other side of the rim and engages with the same pins.

The invention will now be described with reference to the accompanying drawings, in which—

Figure 11:
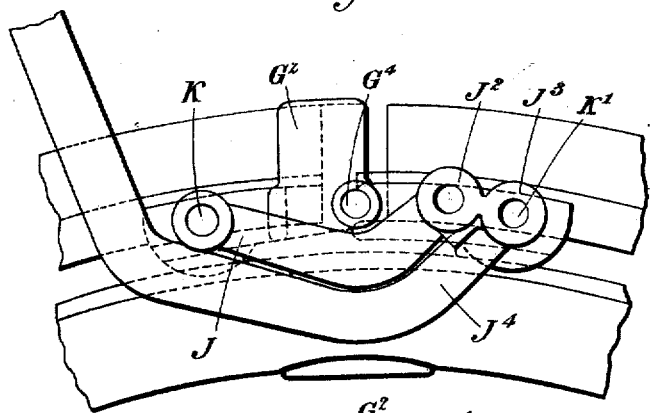
Figure 10:
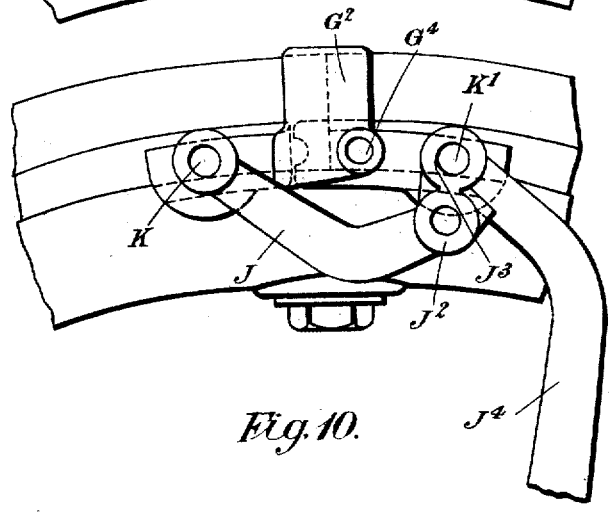

Figure 1 is a view of the under side of one section of the rim showing the improved construction; Figs. 2 and 3 are detail views of the end blocks and the rim; Fig. 4 is an elevation of half the wheel, partly in section, showing the security pads and bolts in position; Fig. 5 a section through a portion of the wheel showing the security pad in position; Fig. 5ª is a similar view of modified form; Figs. 6, 7, 8 and 9 illustrate details of construction of the meeting ends of the rim-sections for use with their improved mechanism for separating the sections; Fig. 10 illustrates the improved mechanism in position before expanding the rim; Fig. 11 the same apparatus after expanding the rim, and Fig. 12 is a perspective view of both portions of the improved expanding tool.

Like letters indicate like parts throughout the drawings.

The first part of our invention will be described with reference to Figs. 1 to 4. The rim, according to this particular construction comprises four segments whereof one is indicated at A. Supporting blocks are secured at each end of each segment and a further support is secured in the center of the same. The central support is provided with a bifurcated extension so that when the section is in position on the felly this extension will engage a driving block secured to the felly of the wheel. At one end of the section a block B is secured either by means of rivets C³, as illustrated, or in any other suitable manner, and extends beyond the end of the section, as illustrated in Fig. 2. The block is provided with a channel D extending back more than half way into the body thereof. At each side of the channel it may be provided with two raised portions D' and the sides have formed on them flanges D² which, when the rim is in position on the wheel, project over the edge thereof and prevent side movement of the rim. The other end of the rim-section is provided with a block C the face of which is set back some distance from the edge of the rim-section and a distance greater than the projection of the block B beyond the edge of the adjacent rim-section. The space E between the face of the blocks C and B is such that a flat key may be inserted easily between them. The block C is provided with two flanges C' C² which also lap over the edge of the wheel when the rim is in place, but the flange C² is elongated and is provided with a slot C⁴. The security pads are inserted in the tire cover and the rim-sections are applied to the tire one on either side of the security bolts so that when brought together the boss projecting from the security pad lies in the channel D in the block B, as illustrated in Fig. 4. When all the sections of the rim have been applied to the tire, with the security pads in place, the rim is expanded by inserting a flat key in the space E; a projection from the key resting in the channel C⁴ which acts as a bearing for the key. The key is then turned through 90° and thus separates the sections. The expanded rim and tire are then lifted on to the wheel and the rim is contracted by the withdrawal of the keys. The security bolts are then passed through holes made for that purpose in the felly of the wheel and are screwed into the security pads. These pads serve the triple purpose of (1) holding the tire against creeping; (2) securing the rim to the wheel by conjunction with the security bolts, and (3) closing the space left between the rim-sections, thereby protecting the inner tube. Holes F are formed in the blocks B and C respectively for the insertion of a tool for prying the last section into position on the tire. It will be seen that in this construction the security pads are placed over the junction of the rim-sections, while the space for the insertion of the expanding key is located to one side thereof.

In a modified construction the boss on the security pad is eliminated and only the thickness of the body of the pad is tapped to receive the bolt. It would not then necessitate the space for the insertion of the key being provided to one side of the security bolt. All that would then be necessary to expand the wheel would be to withdraw the security bolt and insert the key in the space formed immediately under the center of the security pad and at the junction of the blocks, as having no boss, the pad would not extend into the block and a free passage for the key would be provided. One example of such a construction is shown in Fig. 5ª, in which the pad is provided with a bolt M integral therewith, the bolt being provided with a screw-threaded portion to receive a hollow bolt m at the end remote from the pad. In a construction of this character, when the bolt is removed, the key can be inserted in the space between the ends of the segments.

The second part of our invention is illustrated in Figs. 5 to 12. In this case the meeting ends of the sections have a portion cut away, and blocks G and H are secured in the spaces thus formed. They are provided, as before with spaces for the insertion of the security pads and one of them has projections H' which engage in the slots G' formed for that purpose. The blocks G have portions G² which overlap the end of the rim and, when in the contracted position on the wheel, overlap the end of the adjacent rim-section. The blocks G and H have holes G³ and H² respectively formed in them. The projections G² are also provided with holes G⁴ and the projections H' on the block H have semi-circular portions H³ cut away.

The tool for separating the meeting ends of the sections is composed as follows:—A toggle plate J is pivoted at J² to the short arm of the lever J⁴. The other end of the toggle plate J has a boss formed on it and secured in the boss and projecting from it is a pin K. The fulcrum point of the lever J' is also provided with a boss having a pin K' secured thereto.

To separate the sections, the pins K K' are inserted in the holes G³ H², as illustrated in Fig. 10, so that they project from the rim on the opposite side. A similar tool (having holes instead of pins which engage the pins K K') is applied to the pins K K' on the other side of the rim. The two levers are then simultaneously turned in the direction of the arrow until in the position illustrated in Fig. 11. By this means the rim-sections are separated, as shown in Fig. 11, the semi-circular portions H³ registering with the holes G⁴, so that when a pin is inserted in the holes, the rim-sections are locked in their separated position and the lever can thereafter be removed. In order to contract the rim the lever is again applied to it as before described pressed into the expanded position when the locking pin can be withdrawn and the rim allowed to close together. The same expanding tool can also be used for the purpose of applying the last section of the rim to the tire and for detaching the first section. For the latter operation the tool would be used in a reversed position.

Security pads are inserted in the tire so that the bosses thereon rest in the spaces formed for that purpose in the rim block. Extensions to the bosses of each security pad are preferably formed on opposite sides of each screw threaded hole which is engaged by a security bolt. When the tire is off the wheel and is in a deflated condition these extensions or feet L prevent the security pad from falling into the tire by engaging with the ledges G⁴ H⁴ formed for that purpose in the ends of the rim-sections.

It is within this invention to modify the details of construction, provided always that they are kept within the spirit of the invention.

What we claim as our invention and desire to secure by Letters Patent is:—

1. In a detachable rim for a vehicle wheel the combination of a plurality of separable sections placed end to end composing the rim, a tire carried on the outer circumference of the rim thus formed, a security pad having ends overlapping adjacent sections of the rim, a screw threaded portion in the pad for receiving a bolt, and a bolt engaging the screw threaded portion of the pad, the pad and bolt being arranged to clamp the rim sections to the felly of the wheel; substantially as described.

2. In a detachable rim for a vehicle wheel the combination of a plurality of separable sections placed end to end composing the rim, a tire carried on the outer circumference of the rim thus formed, a security pad having ends overlapping adjacent sections of the rim, a screw threaded portion in the pad for receiving a bolt, and a bolt for engaging the screw threaded portion of the pad, the bolt extending through the adjacent ends of two rim sections, said pad and bolt being arranged to clamp the adjacent sections of the rim to the felly of the wheel; substantially as described.

3. In a detachable rim for a vehicle wheel the combination of a plurality of separable sections placed end to end composing the rim, supporting blocks secured one at each end of two adjacent rim sections, a tire carried on the outer circumference of the rim thus formed, a security pad having ends overlapping adjacent sections of the rim, a screw threaded portion in the pad for receiving a bolt, and a bolt for engaging the screw threaded portion of the pad, the bolt extending through the end block of one of the rim sections, said pad and bolt being arranged to clamp the adjacent sections of the rim to the felly of the wheel; substantially as described.

4. In a detachable rim for a vehicle wheel the combination of a plurality of separable sections placed end to end composing a rim, supporting blocks secured one at each end of two adjacent rim sections and so arranged that a space is left between them when the rim sections abut, a tire carried on the outer circumference of the rim thus formed, a security pad inside the tire having on that face toward the center of the rim a screw threaded portion for receiving a bolt and a bolt for securing the rim to the felly of the wheel and that extends through one of the two end blocks and to one side of the space provided between them and engages with the screw threaded portion of the security pad within the tire.

5. In a detachable rim for a vehicle wheel the combination of a plurality of separable sections placed end to end composing the rim, overlapping portions formed on the meeting ends of two of the rim sections, a tire carried on the outer circumference of the rim thus formed, a security pad overlapping the ends of the adjacent ends of the rim sections, a screw threaded portion in the pad for receiving a bolt, and a bolt for engaging the screw threaded portion of the pad, said pad and bolt being arranged to clamp the adjacent sections of the rim to the felly of the wheel; substantially as described.

6. In a detachable rim for a vehicle wheel the combination of a plurality of separable sections placed end to end composing the rim, overlapping portions formed on the meeting ends of two of the rim sections and having circular recesses in the ends of such overlapping portions, and so spaced apart that when the sections are expanded a pin may be inserted between the recesses to maintain the sections in their expanded position.

In testimony whereof we have signed our names to this specification in the presence of two subscribing witnesses.

JOHN WILLIAM HALL.
CYRIL BAYNES.

Witnesses:
HARRY B. BRIDGET,
EDGAR H. ADAMS.